United States Patent [19]

Mizuno

[11] Patent Number: 6,073,689
[45] Date of Patent: Jun. 13, 2000

[54] ACTUATOR CONTROL APPARATUS

[75] Inventor: Kunio Mizuno, Konan, Japan

[73] Assignee: Zexel Corporation, Tokyo, Japan

[21] Appl. No.: 09/028,324

[22] Filed: Feb. 24, 1998

[30] Foreign Application Priority Data

Mar. 3, 1997 [JP] Japan .................................... 9-063856

[51] Int. Cl.[7] ................................ F25B 29/00; H02P 8/00

[52] U.S. Cl. .............................. 165/201; 165/42; 165/43; 318/685; 318/696; 454/75

[58] Field of Search ................................ 165/201, 42, 43; 318/696, 685; 454/75

[56] References Cited

U.S. PATENT DOCUMENTS

| | | | |
|---|---|---|---|
| 4,961,037 | 10/1990 | Orii et al. | 318/685 |
| 5,017,850 | 5/1991 | Harada et al. | 318/685 |
| 5,221,885 | 6/1993 | Molieri et al. | 318/685 |
| 5,461,294 | 10/1995 | Kitazawa | 318/685 |
| 5,767,651 | 6/1998 | Boillat et al. | 318/696 |
| 5,818,193 | 10/1998 | Sasaki | 318/685 |

FOREIGN PATENT DOCUMENTS

| | | | |
|---|---|---|---|
| 0300761 | 1/1989 | European Pat. Off. | 165/43 |
| 60-216793 | 10/1985 | Japan . | |
| 63-151576 | 6/1988 | Japan . | |
| 4-294403 | 10/1992 | Japan . | |

*Primary Examiner*—John K. Ford
*Attorney, Agent, or Firm*—Wenderoth, Lind & Ponack, L.L.P.

[57] ABSTRACT

When implementing an origin reset, operating conditions for the origin reset are corrected in correspondence to changes in operating conditions such as the source voltage to implement an accurate origin reset. Changes in the operating conditions for actuator are detected and if the operating conditions for the actuator have changed in the direction in which the drive force on a member to be driven is reduced, a correction is performed by a means for initial reset control setting in the direction in which the drive torque is increased for the initial reset control and a correction is performed by a means for return control setting to increase the drive torque and to reduce the number of steps during return control, whereas when the operating conditions for the actuator have changed in the direction in which the drive force on the drive member is increased, a correction is performed by the means for initial reset control in the direction in which the drive torque is reduced during the initial reset control, and a correction is performed by the means for return control setting to reduce the drive torque and to increase the number of return steps during the return control.

20 Claims, 7 Drawing Sheets

ACTUATOR CONTROL APPARATUS

BACKGROUND OF THE INVENTION

The present invention relates to an actuator control apparatus for correcting the operating conditions of actuators that drive an intake switching door, a mix door and mode doors in an air condition system for vehicles in correspondence to changes in the actuator operating conditions, during an adjusting operation of the actuators.

In the misalignment detection method for a numerically controlled stepping motor disclosed in Japanese Unexamined Patent Publication No. H4-294403, a signal from an origin detector is taken in for verification every time the stepping motor returns to the origin to make a decision as to whether or not the stepping motor is at the origin. More specifically, an origin hole is formed in a disk mounted at the rotating shaft of the stepping motor, an origin detector that photoelectrically detects the origin hole is provided in the vicinity of the external circumference of the disk and when an origin position command is issued, an NC device causes the stepping motor to rotate at high speed in a specific direction to start the origin positioning. In addition, a decision is made as to whether or not a light-received signal from the origin detector has been input. Then, if the light-received signal has been input, the stepping motor is caused to rotate at low speed whereas if a light-blocked signal has been input, the stepping motor is stopped. Moreover, the volume of data that corresponds to the radius of the origin hole is sent to cause the stepping motor to rotate in return, thereby implementing an origin correction, and verification is made that the light-received signal has been input again before completing the origin positioning control.

In addition, the stepping motor drive circuit disclosed in Japanese Unexamined Patent Publication No. S 60-216793, which comprises a clock circuit that generates a clock signal for controlling the rotation of the stepping motor, a distribution circuit that generates a drive signal to be applied to individual stator coils based upon the clock signal and a PWM control circuit that controls the pulse width of the drive signal so that the motor current detected at a motor current detection unit achieves a preset reference value, is further provided with a correction control circuit which controls the reference value at the PWM control circuit based upon the frequency of the clock signal to perform control of the motor current when the frequency of the clock signal becomes lower. This prevents abnormal rotation caused by an increase in the noise level and the intensified resonance due to the torque which becomes increased to an excessive degree in the vicinity of the resonance in the low speed range.

Furthermore, the four wheel steering apparatus for vehicles disclosed in Japanese Unexamined Patent Publication No. S 63-1515765, which is provided with a means for voltage detection that detects a source voltage applied to the stepping motor, performs correction in response to the output from the means for voltage detection, so that the pulse rate of the drive pulse signal for the stepping motor is increased when the voltage is at or over a specific value. Thus, since the saturation range of the drive pulse signal can be shortened, the quantity of heat generated by the stepping motor can be reduced.

However, in the method disclosed in Japanese Unexamined Patent Publication No. H4-294403, it is necessary to provide a disk and an origin detector at the drive shaft in order to detect and correct misalignment of the drive shaft, and this will go against the general requirements for space saving and a reduction in the number of parts when adopted for driving automotive parts in particular.

In addition, when operating conditions for the actuators change greatly and the members being driven by the actuator are constituted of resin or the like to achieve light weight, as in automobiles, it will result in a significant degree of deformation of the members, and this gives rise to a problem in that a reset cannot be implemented to the correct original set positions. If the actuators are driven at high torque in order to solve this problem, a new problem arises in that operating noise increases.

In the case of the stepping motor drive circuit disclosed in Japanese Unexamined Patent Publication No. S60-216793, on the other hand, since the drive torque is further reduced when the source voltage falls, a problem arises in that a member driven by an actuator cannot reach a specific position. In addition, if the source voltage rises, the member driven by the actuator is driven past the target position, causing a high level of noise and misalignment from the origin position. Problems such as these which are related to changes in the source voltage cannot be solved through the method for source voltage correction disclosed in Japanese Unexamined Patent Publication No.S63-1515765.

SUMMARY OF THE INVENTION

Accordingly, an object of the present invention is to provide an actuator control apparatus with which, when an origin reset is to be implemented, the operating conditions for the origin reset are corrected in correspondence to changes in an actuator operating conditions such as the source voltage to achieve a correct origin reset.

Thus, the actuator control apparatus according to the present invention, which comprises a means for normal control that causes a drive shaft linked to a drive member to rotate in specific steps from an origin in order to position the drive member at a specific position and a means for origin reset control that is constituted of a means for initial reset control that causes the drive means to move to the trailing end of its rotation and a means for return control that returns the drive means from the trailing end of its rotation to the origin, is further provided with a means for operating condition change detection that detects changes in actuator operating conditions, a means for initial reset control setting that selects a drive torque for the means for initial reset control in correspondence to the results of detection performed by the means for operating condition change detection and a means for return control setting that selects the drive torque and a return quantity for the means for return control in correspondence to the results of the detection performed by the means for operating condition change detection.

Thus, according to the present invention, if a change in the actuator operating conditions that has been detected occurs in the direction in which the drive force on the drive member is reduced, a correction is implemented by a means for initial reset control setting in the direction in which the drive torque is increased during initial reset control, and a correction is implemented by the means for return control setting to increase the drive torque and also to reduce the number of return steps during return control. If, on the other hand, the actuator operating conditions change in the direction in which the drive force on the drive member increases, a correction is implemented by the means for initial reset control setting in the direction in which the drive torque is reduced during initial reset control and a correction is implemented by the means for return control setting to reduce the drive torque and also to increase the number of return steps during return control. Thus, since the drive member can be moved to the origin with a high degree of reliability, the drive member can be moved to a specific position with a high degree of reliability.

It is to be noted that members to be driven may preferably include an intake door that opens/closes an internal air induction port and an external air induction port in an air conditioning system for vehicles, a mix door that divides the air that has passed through the evaporator into air that is to pass through the heater core and air that is to bypass the heater core and/or mode doors that open/close a plurality of outlet port ports.

In addition, according to the present invention, the actuator operating condition is preferably the source voltage that is applied to the actuator. In this case, when the source voltage is low, a correction is implemented by the means for initial reset control setting in the direction in which the drive torque is increased during initial reset control and a correction is implemented by the means for return control setting to increase the drive torque for return control and also to reduce the number of return steps. When the source voltage for the actuator is high, on the other hand, the correction is implemented by the means for initial reset control in the direction in which the drive torque is reduced during the initial reset control and the correction is implemented by the means for return control setting to reduce the drive torque and also to increase the number of return steps during the return control. Thus, the drive member can be caused to move to the origin with a high degree of reliability, it becomes possible to move the drive member to a specific position with a high degree of reliability.

Furthermore, it is desirable that the actuator control apparatus according to the present invention be further provided with a means for temperature detection that detects the environmental temperature of the actuator and a means for return quantity correction that corrects a return quantity that has been set by the means for return control setting in correspondence to the environmental temperature detected by the means for temperature detection. With the environmental temperature of the actuator thus detected, a problem related to the actuator environmental temperature can be solved, i.e., changes in the distance between the trailing end of rotation and the origin position caused by expansion of the member to be driven and the like can be corrected, thereby making it possible to move the drive member to the origin position with a high degree of reliability.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate a preferred embodiment. In the drawings.

DETAILED DESCRIPTION OF THE PREFERRED EMBODIMENT

The following is an explanation of an embodiment according to the present invention in reference to the drawings.

Figure 1:
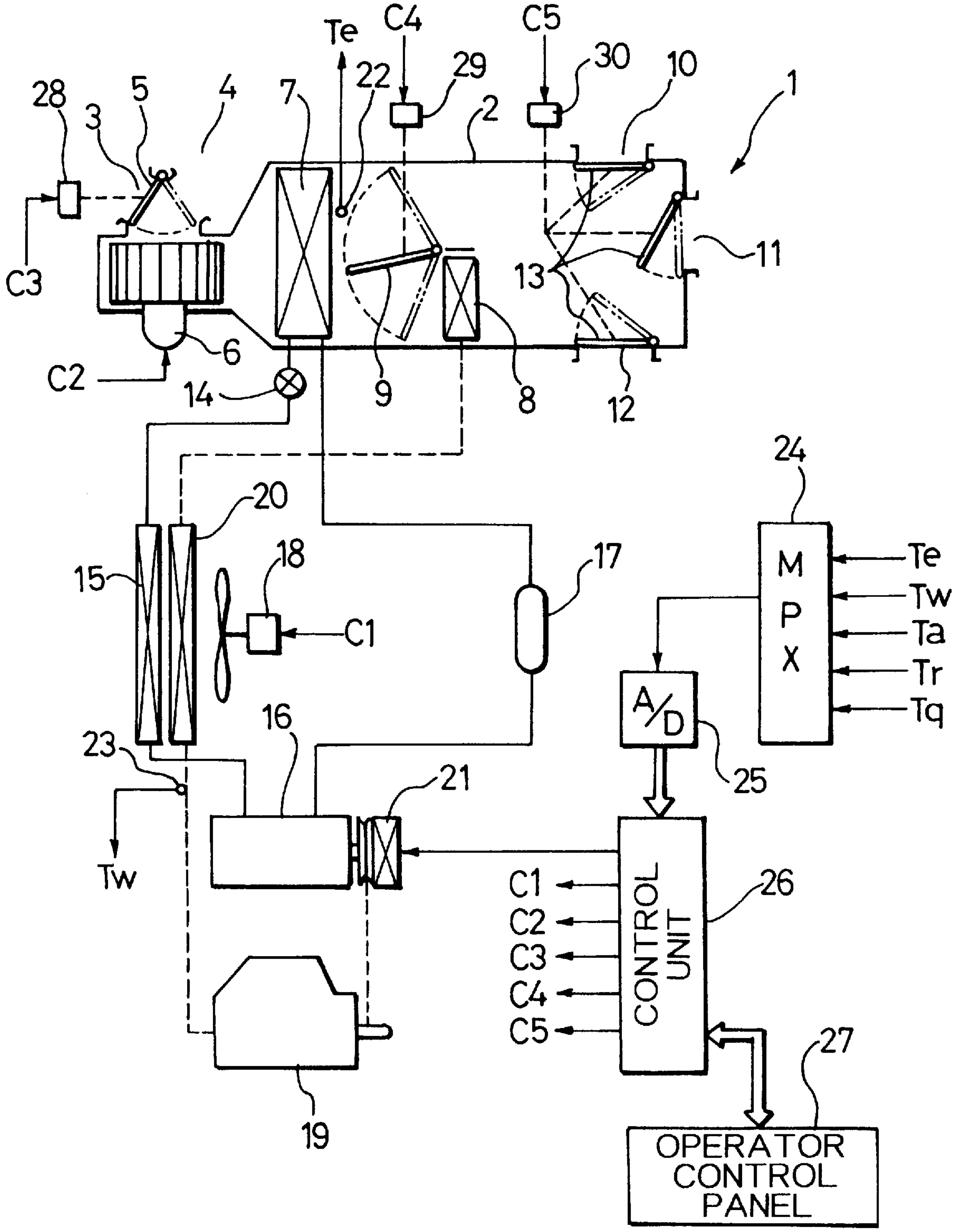
FIG. 1 is a block diagram of an air conditioning system for vehicles at which the actuator control apparatus according to the present invention is mounted.

FIG. 1 shows an air conditioning system for vehicles 1 in which the actuator control apparatus according to the present invention is employed. This air conditioning system for vehicles 1 is provided with an air conditioning duct 2, with an internal air induction port 3 and an external air induction port 4 opening at the upstream-most side of the air conditioning duct 2. The internal air induction port 3 and the external air induction port 4 are opened/closed by an intake door 5 which is driven by an actuator 28. In addition, an air blower 6 is provided at a downstream side of the internal air induction port 3 and the external air induction port 4 to draw air in from the internal air induction port 3 and the external air induction port 4 and send it to a downstream side. It is to be noted that in this embodiment of the invention, actuators that are driven by stepping motors are employed to constitute the actuator 28 and actuators 29 and 30 that are to be detailed below.

An evaporator 7, which functions as a heat exchanger for cooling, is provided at a downstream side of the air blower 6. This evaporator 7, which is connected in series with a compressor 16, a condenser 15 and an expansion valve 14 that, being linked with an engine 19, are driven via an electromagnetic clutch 21 and a receiver tank 17, to constitute a heat exchanging cycle in which the heat absorbed by the evaporator 7 is discharged through the condenser 15. Thus, the evaporator 7 cools the air passing through.

At a downstream side of the evaporator 7, a heater core 8 constituting a heat exchanger for heating is provided. This heater core 8 uses the cooling water of the engine 19 as its heat source, circulating from a radiator 20. It is to be noted that the condenser 15 and the radiator 20 are cooled by an air blower 18.

At an upstream side of the heater core 8 between the heater core 8 and the evaporator 7, a mix door 9 that divides the air that has passed through the evaporator 7 into air that is to pass through the heater core 8 and air that is to bypass the heater core 8 is provided. The mix door 9 is driven by the actuator 29. The two separate flows of air thus achieved by the mix door 9, i.e., the cooled air that has just passed through the evaporator 7 and the air that has further passed through the heater core 8 and has become heated, are mixed at a downstream side of the heater core 8 to achieve a specific temperature. The temperature of this mixed air can be adjusted by the degree to which the mix door 8 is opened.

This mixed air is discharged into the cabin through a defrost outlet port 10, a vent outlet port 11 and a foot outlet port 12 opening at the downstream-most side of the air conditioning duct 2. The defrost outlet port 10, the vent outlet port 11 and the foot outlet port 12 are selectively opened/closed by mode doors 13 which comprise doors for opening/closing the individual outlet ports, and the mode doors 13 comprising the plurality of doors are opened/closed by a link mechanism which is driven by one of the actuators, i.e., the actuator 30.

The air conditioning system for vehicles 1 structured as described above is controlled by a control unit 26 to which detection signals from sensors 22, 23 and the like, e.g., the evaporator temperature Te, the cooling water temperature Tw, the external air temperature Ta, the cabin internal temperature Tr and the detected solar radiation quantity Tq, are input via a multiplexer (MPX) 24 and an A/D converter 25 in addition to setting signals (a temperature setting signal Ts, various mode setting signals for manual setting and the like) that are sent from an operator control panel 27. After these signals are processed by a specific program, output signals (C1~C5) are output to the various control devices such as the electromagnetic clutch 21, the air blowers 6 and 18, the actuators 28, 29 and 30 and the like.

Figure 2:
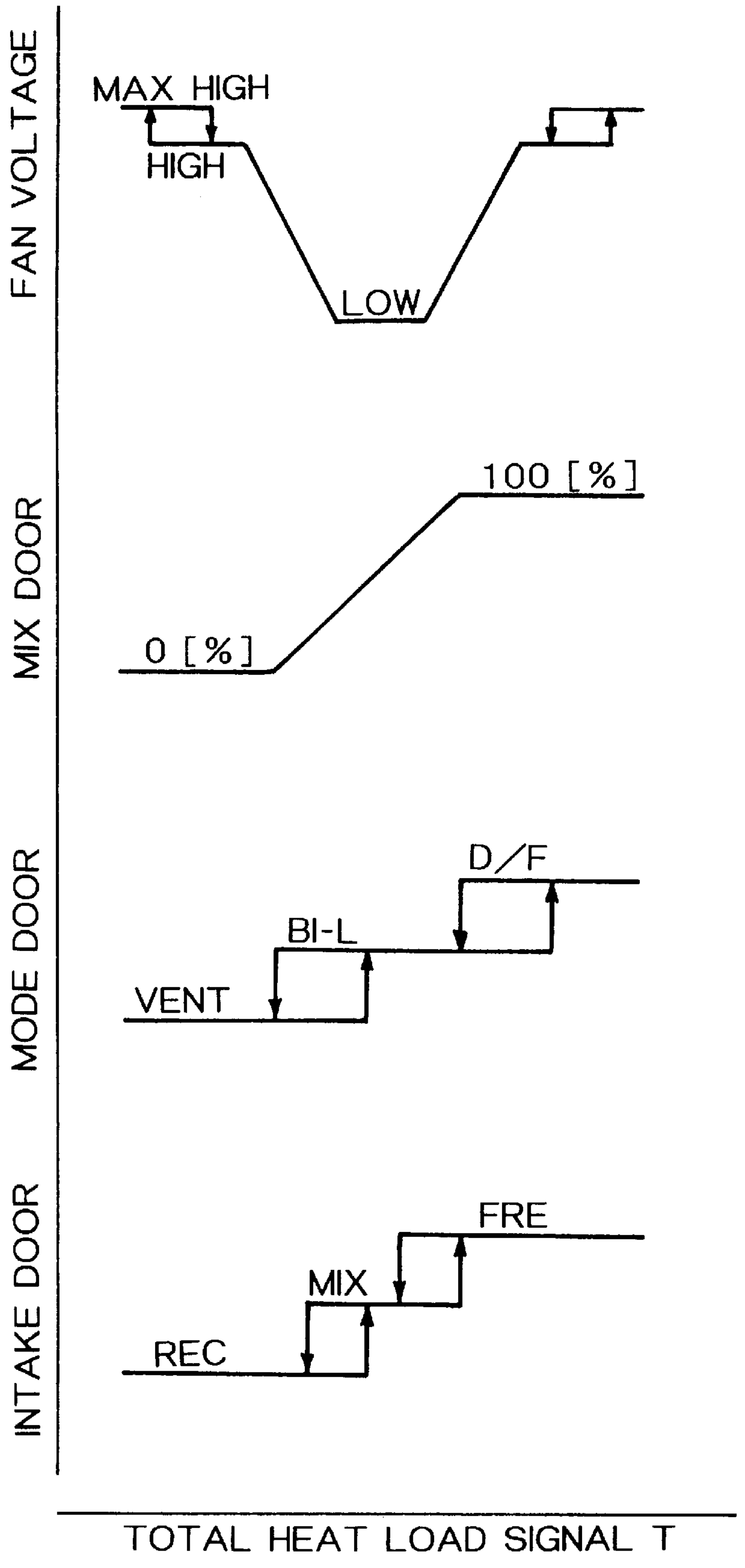
FIG. 2 is a characteristics diagram illustrating the settings of the control states of the individual control devices in correspondence to the total heat load signal which determines the control states of the air conditioning control devices in the air conditioning system for vehicles.

For instance, in an automatic control mode, a total heat load signal T is calculated to constitute a heat load signal based upon the detection signals and the setting signals, and based upon the total heat load signal T, control of the various control devices is selected and executed in conformance to the characteristics diagram presented in FIG. 2. The fan voltage applied to the air blower 6 is set to high to provide a large air quantity when the heat load is large and the degree of necessity for cooling is high (left end the figure) and when the heat load is small and the degree of necessity for heating is high (right end in the figure), whereas, it is set to low to provide a small air quantity in the middle range where the heat load is moderate. In particular, at the two extreme ends at which the degree of necessity for rapid cooling and rapid heating is high, the fan voltage may be set to maximum high (MAX HIGH).

Likewise, the degree of opening of the mix door 9 can be set from 0% to 100% by the total heat load signal T, and a drive signal is output to the actuator 29 in conformance to the degree of opening thus set. The drive signal is set in conformance to the number of steps from the initial position (0 steps) of the mix door 9, and more specifically, the degree of opening is set to 0% at 0 steps, to 1% at 70 steps, to 50% at 540 steps, to 99% at 970 steps and to 100% at 1060 steps.

In addition, with the mode door actuator 30, a vent mode (VENT) in which only the vent outlet port 11 is opened, a bi-level mode (BI-L) in which the vent outlet port 11 and the foot outlet port 12 are opened or a def-foot mode (D/F1 or D/F2) in which the foot outlet port 12 and the defrost outlet port 10 are opened is set by the total heat load signal T. These modes are selected in correspondence to the position set in correspondence to the number of steps at the actuator 30. More specifically, the vent mode is set with the actuator 30 at 0 steps, the BI-L mode is set at 430 steps, the D/F1 mode is set at 810 steps, the D/F2 mode is set at 950 steps and at 1350 steps, only the defrost outlet port 10 is open when the defrost mode is set manually.

Furthermore, with the intake door 5, an internal air circulation mode (REC) in which only the internal air induction port 3 is opened, a mixed air mode (MIX), in which external air is brought in at a ratio of 20% by slightly opening the external air induction port 4 or an external air induction mode (FRE) in which only the external air induction port 4 is opened is set with the total heat load signal T. The selection is made from these modes by the position set in conformance to the number of steps at the actuator 28. More specifically the REC mode is selected at 0 steps, the MIX mode is selected at 240 steps and the FRE mode is selected at 770 steps.

In order to set the intake door 5, the mix door 9 and the mode doors 13 at specific positions with a high degree of reliability with the actuators 28, 29 and 30, it is necessary to set the doors 5, 9 and 13 at their initial positions (origin: 0 steps) with a high degree of reliability. Thus, in the origin reset control for resetting the doors 5, 9 and 13 at their initial positions with a high degree of reliability, which includes initial reset control through which the doors 5, 9 and 13 are first placed in contact with one end of the rotation (reset positions) and return control through which they are returned from the reset positions to the initial positions, the doors 5, 9 and 13 are first pressed at the positions before they are returned to the initial positions to set the doors 5, 9 and 13 at their initial positions with a high degree of accuracy. It is to be noted that normally, to achieve the reset positions, the actuator 28 for the intake door 5 is set at 100 steps, the actuator 29 for the mix door 9 is set at 100 steps and the actuator 30 for the mode doors 13 is set at 150 steps.

Figure 3:
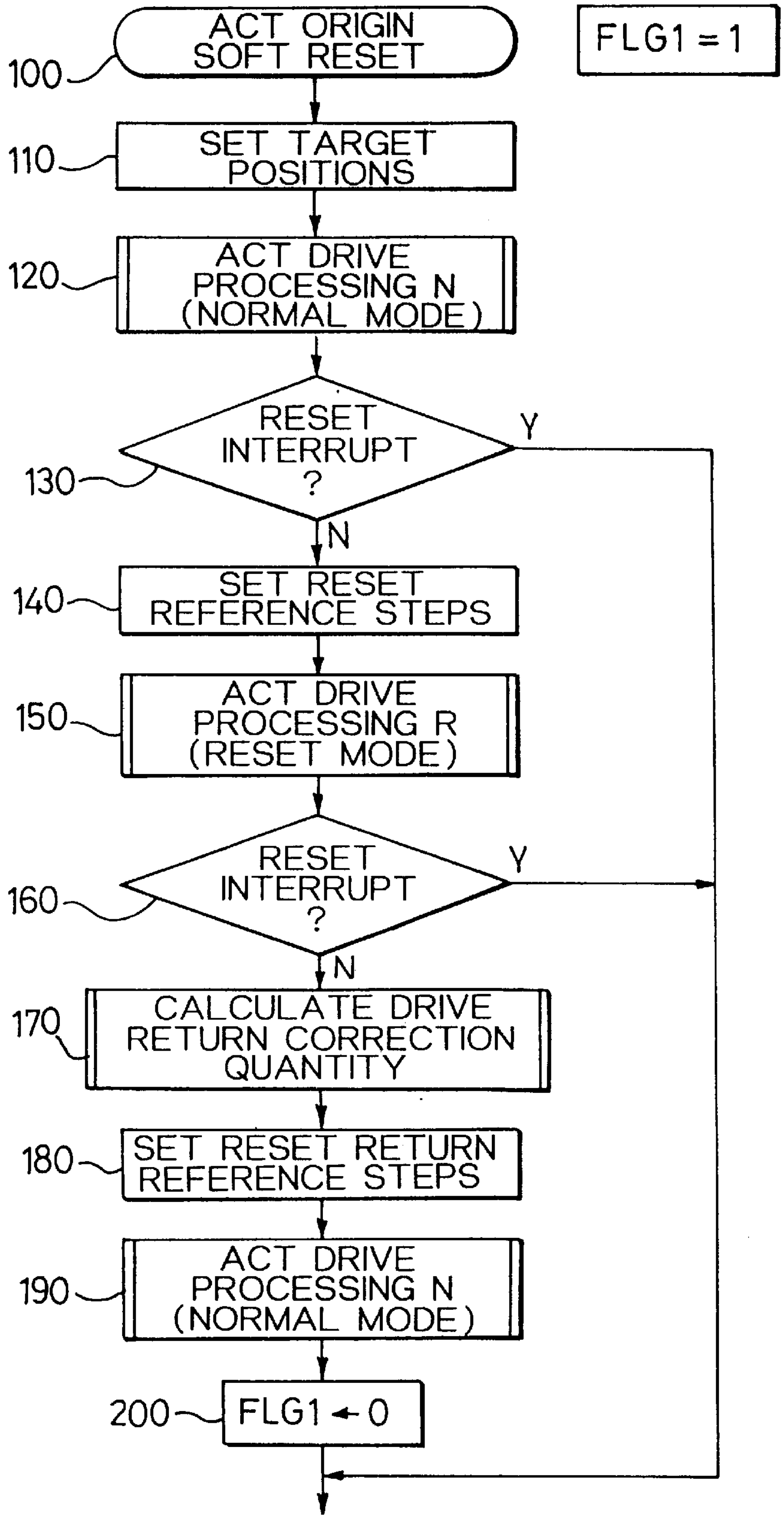
FIG. 3 is a flowchart illustrating the origin soft reset control.
Figure 7:
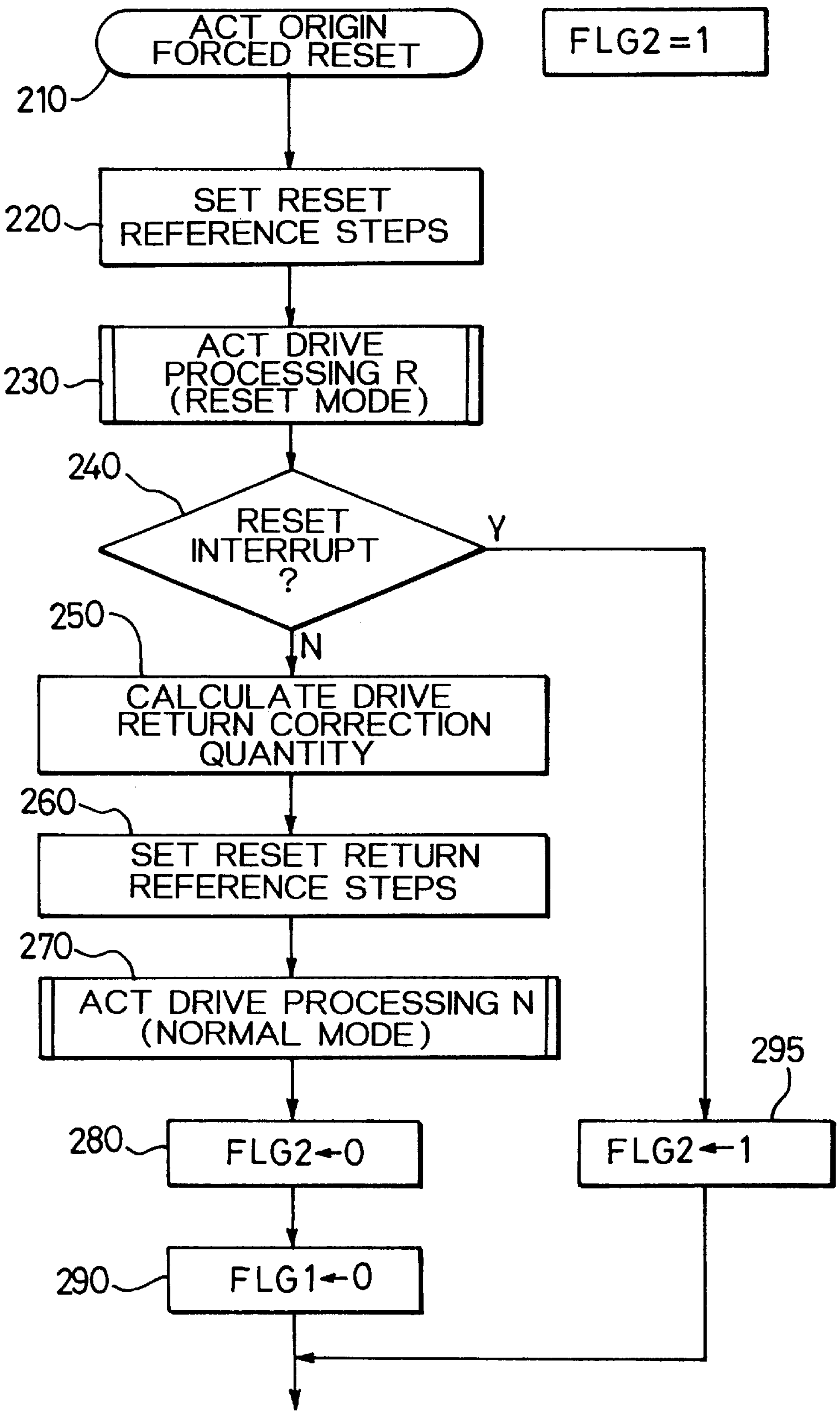
FIG. 7 is a flowchart illustrating the origin forced reset control.

The origin reset control comprises actuator (ACT) origin soft reset control which is illustrated in FIG. 3 and actuator (ACT) origin forced reset control which is illustrated in FIG. 7. The ACT origin soft reset control is the type of origin reset control that achieves a reduction in the drive noise of the actuators, whereas the origin forced reset control is the type of origin reset control that is executed while the current positions of the doors 5, 9 and 13 have not been ascertained.

These types of origin reset control are incorporated as part of the main control routine of the air conditioning control described earlier, and are executed at specific settings. For instance, the operation branches out to execute the ACT origin soft reset control when 1 is set for a flag 1 (FLG1=1) in the main control routine.

The ACT origin soft reset control illustrated in FIG. 3 starts at step 100 when 1 is set for the FLG1 (FLG1=1) and with the number of times a flag 3 which is to be detailed below is set counted, the control is executed every time the count reaches 60. In step 110, the target positions for the doors 5, 9 and 13 are set. These target positions are the initial positions corresponding with 0 steps at the actuators 28, 29 and 30. To be more specific, 0% is set for the degree of opening of the mix door 8, the VENT mode is set for the mode doors 13 and the REC mode is set for the intake door 5 respectively. Then, in step 120, the actuator (ACT) drive processing N (normal mode) for driving the doors 5, 9 and 13 to those positional settings is executed.

Figure 4:
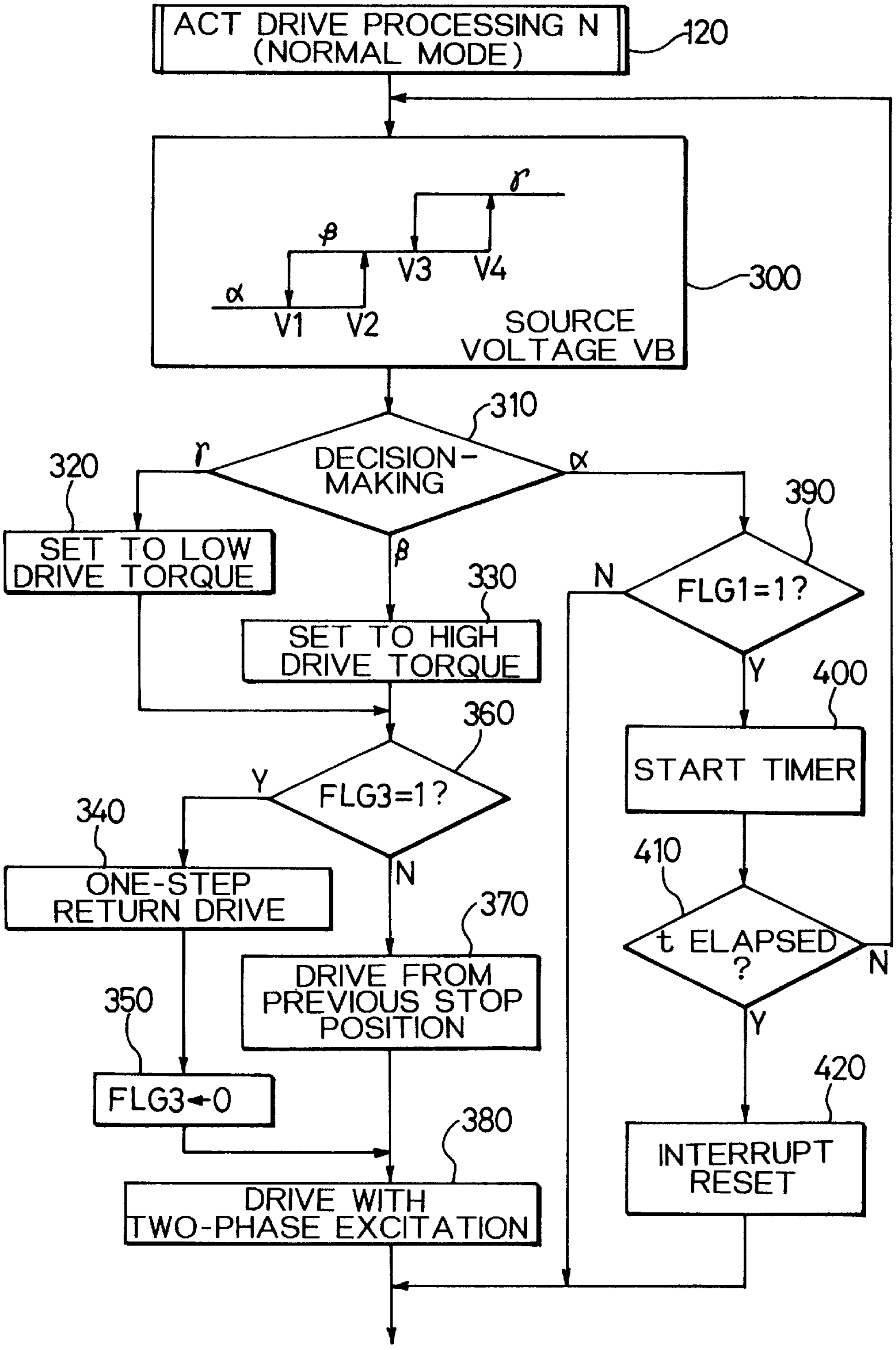
FIG. 4 is a flowchart illustrating the ACT drive processing N (normal mode)

In the ACT drive processing N, a decision is made in regard to a change in the source voltage (VB) applied to the actuators in step 300, as illustrated in FIG. 4. This decision-making is performed in conformance to a characteristic curve having two decisions α and β that incorporate hysteresis at the values of source voltages V1 (9V) and V2 (9.5V) and having two decisions β and γ that incorporate hysteresis at the values of source voltages V3 (11.8V) and V4 (12.3V). α is given priority in the hysteresis between V1 and V2 and γ is given priority in the hysteresis between V3 and V4.

In the decision-making in regard to the source voltage (VB) the decision γ is selected if the source voltage has changed to V4 (12.3V) or higher, or if it is at V3 (11.8V) or higher before the operation proceeds to step 320 to set the drive torque to low. In addition, if the source voltage has changed from a level of V3 (11.8V) or higher to a level of V3 (11.8V) or lower, or if the source voltage has changed from a level of V2 (9.5V) or lower to a level of V2 (9.5V) or higher, the decision β is selected before the operation proceeds to step 330 to set the drive torque to high. More specifically, in step 320, the number of pulses for the drive signal for the actuators is set to 250 pps, whereas in step 330, the number of pulses for the drive signal for the actuators is set to 166 pps so that a higher drive torque can be achieved compared to that at 250 pps.

In step 360, a decision is made as to whether or not the flag 3 is set to 1, and if the flag 3 is set to 1, the operation proceeds to step 340, in which one step return drive is set. Then, in step 350, the flag 3 is reset to its initial value and in step 380, the actuators 28, 29 and 30 are driven through two-phase excitation based upon the settings described above. If, on the other hand, it is decided in step 360 that the flag 3 is not set to 1, setting is made to effect drive from the previous stopped position in step 370, and in step 380, the actuators 28, 29 and 30 are driven through two-phase excitation based upon these settings. The flag 3, which is a one step return flag, corrects misalignment occurring when the actuators stop due to a fall in the source. While the source voltage is monitored by a microcomputer inside the control unit 26 under normal circumstances, there is a delay between the actual output of a stop instruction from the microcomputer and the time the actuators actually stop. In order to correct this time delay, one step return drive is implemented. In the actuator (ACT) monitoring routine, a positional misalignment flag, which is set when the actuators are stopped due to a fall in the source, is monitored, and in correspondence to the status of the positional misalignment flag, the flag 3 is set within a signal calculation processing routine in the main control routine.

Thus, when the source voltage is high, a low drive torque is set to reduce the drive noise, whereas when the source voltage is low, the drive torque is set to high to cause the doors 5, 9 and 13 to move to their initial positions with a high degree of reliability. It is to be noted that through the two-phase excitation, rotation is achieved one step at a time by sequentially changing the state of continuity between two coils among a plurality of coils and that reliable operation is assured even though the noise level is high due to the torque is higher than that in single phase excitation.

In addition, if it is decided in step 300 that the source voltage has changed from a level of V1 (9V) or higher to a level of V1 (9V) or lower or that the source voltage is at V2 (9.5V) or lower, a decision α is selected to set the stopped mode. In this case, the operation proceeds to step 390 in which a decision is made as to whether or not the origin soft reset control is in effect (whether or not the flag 1 is set to 1), and if it is decided that the origin soft reset control is not in effect, the operation exits this control to proceed to the next control, whereas if it is decided the origin soft reset control is in effect, a timer is started in step 400 and then the length of the elapsed time is counted in step 410. If it is decided in step 410 that the length of the elapsed time has not reached t (2 seconds), the operation returns to perform decision-making in step 300, whereas if the decision α has been selected continuously for t or more, a reset interrupt is set in step 420 to exit the ACT drive processing control N. Thus, if the source voltage applied to the actuators 28, 29 and 30 is too low, it is decided that the reset control cannot be executed to a full extent and the reset is interrupted.

Back in the flowchart shown in FIG. 3, a decision is made as to whether or not a reset interrupt has been set in step 130. If it is decided in step 130 that a reset interrupt has been set, the operation exits the ACT origin soft reset control to return to the main control routine to interrupt the ACT origin soft reset control. However, if it is decided in step 130 that a reset interrupt has not been set, the operation proceeds to step 140 to set the reset reference steps and the drive direction.

In step 140, the reset reference steps for driving the doors 5, 9 and 13 from the initial positions to the reset positions are set. These reset reference steps are each set at a value larger than the number of steps from each initial position to the corresponding reset position, i.e., at the number of steps that assures that each of the doors 5, 9 and 13 is caused to move to its reset position with a high degree of reliability. More specifically, 130 (the actual number of steps 100+30) is set for the intake door 5 and the mix door 9 and 180 (the actual number of steps 150+30) is set for the mode doors 13.

Then, in step 150, the ACT drive processing R (reset mode) is set. In the ACT drive processing R illustrated in FIG. 5, a decision is made in regard to a change in the source voltage (VB) applied to the actuators 28, 29 and 30 in step 500. This decision-making is performed in conformance to a characteristics curve having two decisions, α and β, that incorporate hysteresis at the values of source voltages V5 (9V) and V6 (9.5V) and having two decisions, β and γ, incorporating hysteresis at the values of source voltages V7 (12.5V) and V8 (13V). α is given priority in the hysteresis between V5 and V6 and γ is given priority between V7 and V8.

In the decision-making in regard to the source voltages (VB) the decision γ is selected if the source voltage has changed to a level of V8 (13V) or higher, or if it is at a level of V7 (12.5V) or higher before the operation proceeds to step 520 to set the drive torque to low. In addition, if the source voltage has changed from a level of V7 (12.5V) or higher to a level of V7 (12.5V) or lower, or if the source voltage has changed from a level of V6 (9.5V) or lower, to a level of V6 (9.5V) or higher, the decision β is selected before the operation proceeds to step 350 to set the drive torque to high. More specifically, in step 520, the number of pulses for the drive signal for the actuators is set to 250 pps whereas in step 530, the number of pulses for the drive signal for the actuators is set to 166 pps so that a higher drive torque can be achieved compared to that at 250 pps.

Then, in step 540, the actuators 28, 29 and 30 are driven through single-phase excitation based upon the settings described above. Thus, when the source voltage is high, a low drive torque is set in order to reduce the drive noise, whereas when the source voltage is low, the drive torque is set to high to cause the doors 5, 9 and 13 to move to the initial positions with a high degree of reliability. It is to be noted that the single phase excitation through which rotation is implemented one step at a time by sequentially changing the state of continuity in individual coils in the plurality of coils, achieves an advantage in that noise is reduced since the torque is less than that in the two phase excitation.

In addition, if it is decided in step 500 that the source voltage has changed from a level of V4 (9V) or higher to a level of V4 (9V) or lower or that the source voltage is at V5 (9.5V) or lower, the decision α is selected to set the stopped mode. In this case, the operation proceeds to step 550 to start the timer and then the length of the elapsed time is counted in step 560. If it is decided in step 560 that the length of the elapsed time has not reached t (2 seconds), the operation returns to perform decision-making in step 500, whereas if the decision α has been selected continuously for t or more, a reset interrupt is set in step 570 to exit the ACT drive processing control R. Thus, if the source voltage applied to the actuators 28, 29 and 30 is too low, it is decided that the reset control cannot be executed to a full extent and the reset is interrupted, as explained earlier.

In the flowchart in FIG. 3, after the ACT drive processing control R is performed in step 150, a decision is made in step 160 as to whether or not a reset interrupt has been set. In this decision-making, too, as in the decision-making in step 130, if it is decided that a reset interrupt has been set, the operation exits the ACT origin soft reset control to return to the main control routine. However, if it is decided in step 160 that a reset interrupt has not been set, the operation proceeds to step 170 to calculate the ACT drive return quantity.

Figure 6:
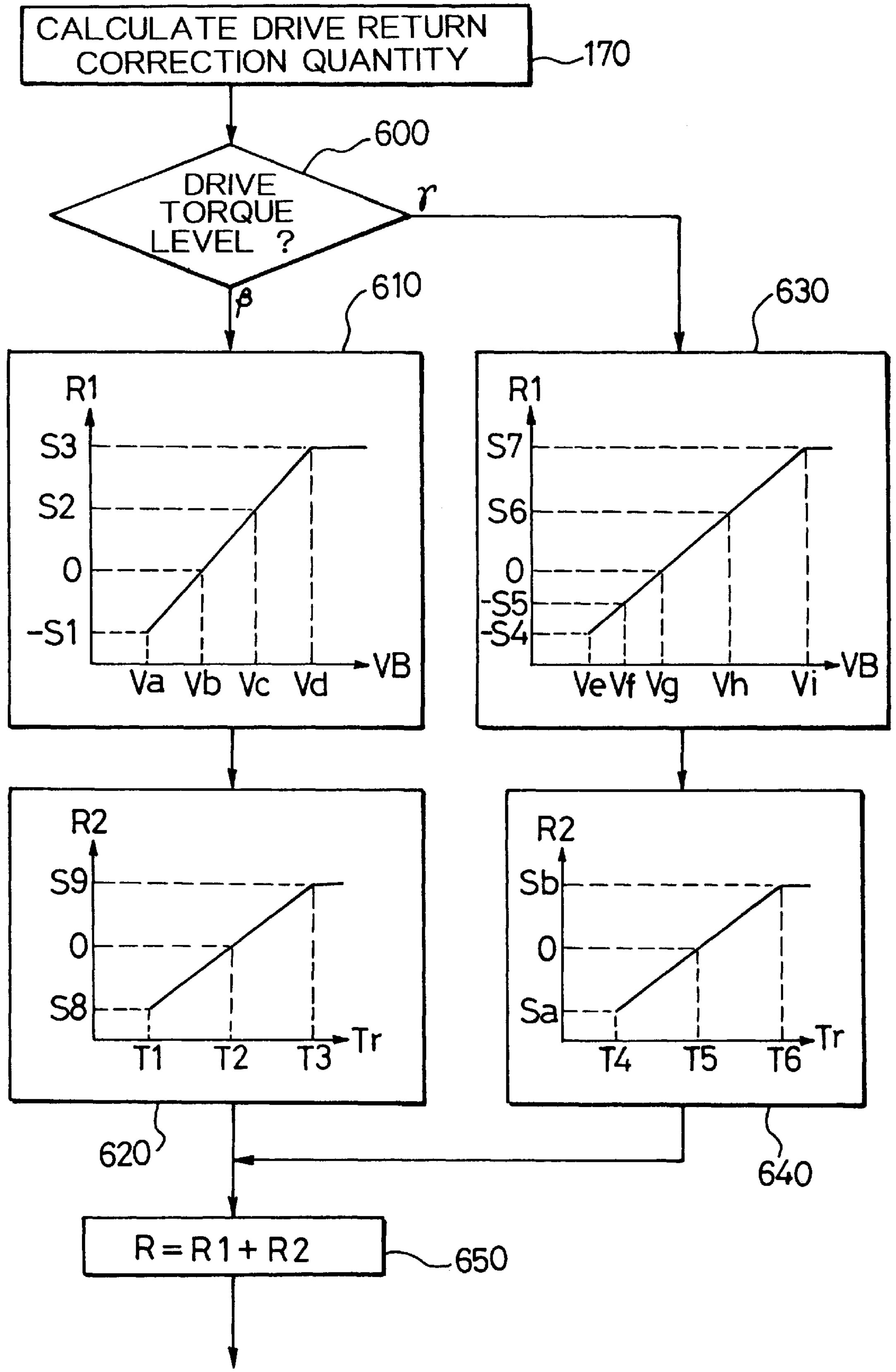
FIG. 6 is a flowchart illustrating the calculation of the drive return correction quantity.

The calculation of the ACT drive return quantity is illustrated in the flowchart in FIG. 6, and in step 600, a decision is made as to whether the drive torque set during the ACT drive processing N or the ACT drive processing R is at small (decision γ) or large (decision β). If it is decided that the drive torque is set to high (decision β), the operation proceeds to step 610 to calculate a return correction quantity corresponding to the source voltage VB. In step 610, the characteristics curve is set so that the source voltage Va (10V) corresponds to a return correction quantity −S1 (−30 steps), the source voltage Vb (11V) corresponds to a return correction quantity 0, the source voltage Vc (12V) corresponds to a return correction quantity S2 (30 steps) and a source voltage Vd (13V) corresponds to a return correction quantity S3 (60 steps). Then, based upon the characteristics curve, the correction quantity R1 is calculated using the source voltage VB.

The operation then proceeds to step 620 to calculate a return correction quantity R2 in correspondence to the cabin internal temperature Tr. This characteristics curve is set so that the cabin internal temperature T1(−30° C.) corresponds to a return correction quantity −S8 (−30 steps), the cabin internal temperature T2 (25° C.) corresponds to a return quantity 0 and the cabin internal temperature T3 (55° C.) corresponds to a return correction quantity S9 (30 steps). Then, based upon the characteristics curve, the return correction quantity R2 is calculated using the cabin internal temperature Tr.

In addition, if it is decided that the drive torque is set to low (decision γ), in the decision-making in step 600, the operation proceeds to step 630 to calculate a return correction quantity corresponding to the source voltage VB. In step 630, the characteristics curve is set so that the source voltage Ve (12.5V) corresponds to the return correction quantity −S4 (−28 steps), the source voltage Vf (13V) corresponds to a return correction quantity −S5 (−15 steps), the source voltage Vg (14V) corresponds to a return correction quantity 0, the source voltage Vh (15V) corresponds to a return correction quantity S6 (15 steps) and the source voltage Vi (16V) corresponds to a return correction quantity S7 (30 steps). Then, based upon the characteristics curve, the return correction quantity R1 is calculated using the source voltage VB. The drive torque is determined to be set to low in the decision-making concerning the source voltage in step 630 when the source voltage is decided to be high, meaning that the source voltage is set higher than that in the decision-making performed in step 610, and since the drive torque is set to low in such a case, a change in the correction quantity relative to a change in the voltage is set smaller compared to that in the decision-making performed in step 610.

The operation then proceeds to step 640 to calculate the return correction quantity R2 in correspondence to the cabin internal temperature Tr. This characteristics curve is set so that the cabin internal temperature T4(−30° C.) corresponds to a return correction quantity −Sa (−20 steps), the cabin internal temperature T5 (25° C.) corresponds to a return quantity 0 and the cabin internal temperature T6 (55° C.) corresponds to a return correction quantity Sb (20 steps). Then, based upon the characteristics curve, the return correction quantity R2 is calculated using the cabin internal temperature Tr. With this, corrections can be made for changes in the number of steps to the reset positions that are caused by changes in the manner in which the air conditioning duct 2 which is constituted of a resin or the like becomes deformed because of changes in the intensity of the force with which the doors 5, 9 and 13 are pressed against the air conditioning duct 2, by changes in the degree of deformation of the insulators mounted at the doors 5, 9 and 13, or by expansion or contraction of the air conditioning duct 2 due to changes in the temperature.

Then, in step 650, a return correction quantity R (R=R1+R2) is calculated using the return correction quantity R1 corresponding to the change in the source voltage set in step 610 or 630 and the return correction quantity R2 corresponding to the change in the cabin internal temperature set in step 620 or 640.

Then, in step 180, in conformance to the correction quantity set in step 170, the reset return reference steps are set. More specifically, 100+R is set as the number of reset return reference steps for the intake door 5 and the mix door 9, and 150+R is set as the number of reset return reference steps for the mode doors 13. Thus, ACT drive processing N similar to that performed in step 120 is executed in step 190 to drive the actuators 28, 29 and 30 to move the doors 5, 9 and 13 to their initial positions. Then, in step 200, the initial value 0 is set at the flag 1 (FLG1←0) before ending the ACT origin soft reset control.

In addition, the origin forced reset control illustrated in FIG. 7 is executed if the current positions of the doors 5, 9 13 are not ascertained, e.g., when the source has just been turned on immediately after a battery has been connected or when the ignition switch is turned off during the actuator origin reset control to interrupt the actuator origin reset control, and when a flag 2 (FLG2) is set to 1, the operation shifts from the main control routine to the origin forced reset control.

In the origin forced reset control, which starts in step 210, the reset reference steps are set in step 220. The reset reference steps set in step 220 may be, for instance, as follows: 970 steps for the intake door 5, 1260 steps for the mix door 9 and 1600 steps for the mode doors 13. These are set as the number of steps that assure reliable resetting of the doors 5, 9 and 13 to their reset positions, since the number of steps from the reset position to the full rotation position for the intake door 5 is 870 steps (770 steps+100 steps), the number of steps from the reset position to the full rotation position for the mix door 9 is 1160 steps (1060 steps+100 steps) and the number of steps from the reset position to the full rotation position for the mode doors 13 is 1500 steps (1450 steps+50 steps).

Figure 5:
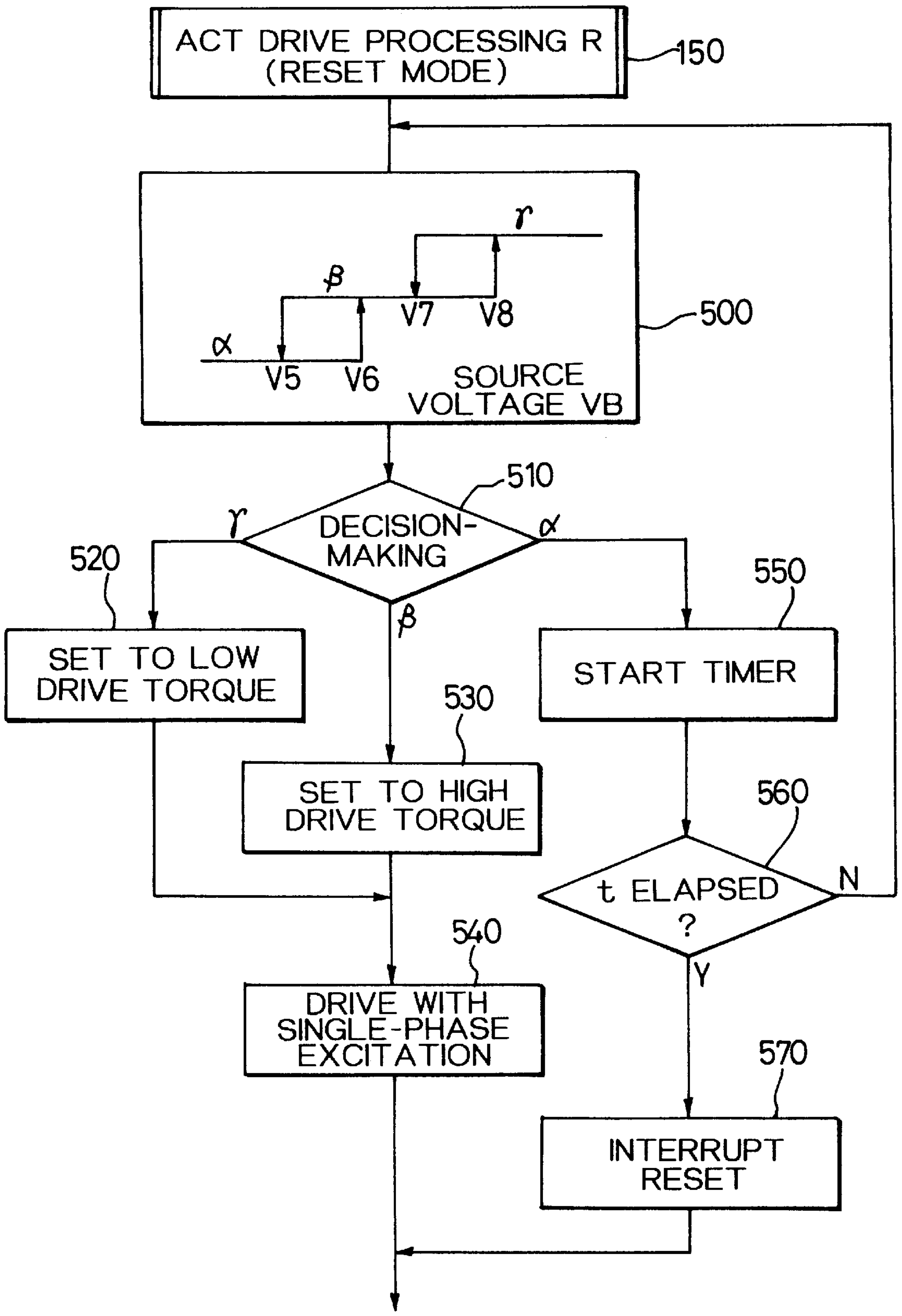
FIG. 5 is a flowchart illustrating the ACT drive processing R (reset mode)

Based upon the reset reference steps set in step 220, the ACT drive processing R (step 150) illustrated in FIG. 5 is executed in step 230, and with the drive torque selected by making a decision in regard to the changes in the source voltage, the doors 5, 9 and 13 are caused to move to the reset positions. Then, if it is decided in step 240 that a reset interrupt has been set, the operation proceeds to step 295, to set 1 for the flag 2 again so that the operation returns to the main control routine to execute the origin forced reset control again. If, on the other hand, it is decided in step 240 that a reset interrupt has not been set, the operation proceeds to step 250 to calculate the return correction quantity R (R=R1+R2) using the return correction quantity R1 corresponding to the change in the source voltage and the return correction quantity R2 corresponding to the change in the cabin internal temperature, as in step 170 explained earlier.

Then, in step 260, in conformance to the correction quantity set in step 250, the reset return reference steps are set More specifically, 100+R is set as the number of reset return reference steps for the intake door 5 and the mix door 9 and 150+R is set as the number of reset return reference steps for the mode doors 13. Thus, ACT drive processing N similar to that performed in step 120 and step 190 is executed in step 270 to drive the actuators 28, 29 and 30 and drive the doors 5, 9 and 13 to their initial positions. Then, in step 280, the initial value 0 is set at the flag 2 (FLG2←0) and an initial value 0 is set at the flag 1 (FLG←0) in step 290 to end the ACT origin forced reset control.

As has been explained, according to the present invention, by selecting the drive torque for the actuators in correspondence to operating conditions such as the source voltage, an accurate origin reset can be implemented while minimizing the operating noise, with the drive torque set to high when a high drive torque is required and a low drive torque selected to reduce the noise when a larger drive torque is not required.

Moreover, since the return quantities for the actuators are corrected in correspondence to the selected drive torque, the members to be driven by the actuators can be caused to move to the initial positions with a high degree of reliability, thereby achieving an improvement in the controllability of the members to be moved.

What is claimed is:

1. An actuator control apparatus comprising:

a drive member, an actuator having a drive shaft linked to said drive member and a means for drive that drives said drive shaft in order to place said drive member at a specific position;

a means for normal control that causes said drive shaft to rotate from an origin thereof in specific steps;

a means for origin reset control constituted of a means for initial reset control that causes said drive shaft to move to a trailing end of rotation and a means for return that returns said drive shaft from said trailing end of rotation to said origin;

a means for operating condition change detection that detects changes in operating conditions of said actuator;

a means for initial reset control setting that selects a high drive torque for said means for initial reset control when said operating conditions detected by said means for operating condition change detection changes in a direction in which the drive force of said drive shaft is reduced and selects a low drive torque for said means for initial reset control when said operating conditions change in a direction in which said drive force of said drive shaft increases; and a means for return control setting that selects a high drive torque for said means for return and reduces the number of steps when said operating conditions detected by said means for operating condition change detection have changed in said direction in which said drive force of said drive shaft is reduced, and select a low drive torque for said means for return and increases said number of steps when said operating conditions have changed in said direction in which said drive force of said drive shaft increases.

2. An actuator control apparatus according to claim 1, wherein:

said operating condition of said actuator is a source voltage applied to said actuator.

3. An actuator control apparatus according to claim 1, further comprising:

a means for temperature detection that, functioning as a portion of said means for operating condition change detection, detects the environmental temperature of said actuator; and a means for return quantity correction that corrects a return quantity that has been set by said means for return control setting in correspondence to said environmental temperature detected by said means for temperature detection.

4. An actuator control apparatus according to claim 2, further comprising:

a means for temperature detection that, functioning as a portion of said means for operating condition change detection, detects the environmental temperature of said actuator; and a means for return quantity correction that corrects a return quantity that has been set by said means for return control setting in correspondence to said environmental temperature detected by said means for temperature detection.

5. An actuator control apparatus according to claim 1, wherein:

said member to be driven is an intake door that opens/closes an internal air induction port and an external air induction port in an air conditioning system for vehicles.

6. An actuator control apparatus according to claim 1, wherein:

said drive member is a mix door provided at a downstream side of a heat exchanger for cooling provided in an air conditioning system for vehicles, that adjusts the quantity of air that passes through a heat exchanger for heating provided at a downstream side of said heat exchanger for cooling.

7. An actuator control apparatus according to claim 1, wherein:

said drive member is mode doors that open/close outlet ports in an air conditioning system for vehicles.

8. An actuator control apparatus according to claim 2, wherein:

said member to be driven is an intake door that opens/closes an internal air induction port and an external air induction port in an air conditioning system for vehicles.

9. An actuator control apparatus according to claim 2, wherein:

said drive member is a mix door provided at a downstream side of a heat exchanger for cooling provided in an air conditioning system for vehicles, that adjusts the quantity of air that passes through a heat exchanger for heating provided at a downstream side of said heat exchanger for cooling.

10. An actuator control apparatus according to claim 2, wherein:

said drive member is mode doors that open/close outlet ports in an air conditioning system for vehicles.

11. An actuator control apparatus according to claim 3, wherein:

said member to be driven is an intake door that opens/closes an internal air induction port and an external air induction port in an air conditioning system for vehicles.

12. An actuator control apparatus according to claim 3, wherein:

said drive member is a mix door provided at a downstream side of a heat exchanger for cooling provided in an air conditioning system for vehicles, that adjusts the quantity of air that passes through a heat exchanger for heating provided at a downstream side of said heat exchanger for cooling.

13. An actuator control apparatus according to claim 3, wherein:

said drive member is mode doors that open/close outlet ports in an air conditioning system for vehicles.

14. An actuator control apparatus according to claim 4, wherein:

said member to be driven is an intake door that opens/closes an internal air induction port and an external air induction port in an air conditioning system for vehicles.

15. An actuator control apparatus according to claim 4, wherein:

said drive member is a mix door provided at a downstream side of a heat exchanger for cooling provided in an air conditioning system for vehicles, that adjusts the quantity of air that passes through a heat exchanger for heating provided at a downstream side of said heat exchanger for cooling.

16. An actuator control apparatus according to claim 4, wherein:

said drive member is mode doors that open/close outlet ports in an air conditioning system for vehicles.

17. An actuator control apparatus according to claim 1, wherein:

said drive member comprises an intake door that opens/closes an internal air induction port and an external air induction port in an air conditioning system for vehicles, a mix door provided at a downstream side of a heat exchanger for cooling provided in said air conditioning system for vehicles which adjusts a quantity of air that passes through a heat exchanger for heating provided at a downstream side of said heat exchanger for cooling and mode doors that open/close outlet ports in said air conditioning system for vehicles.

18. An actuator control apparatus according to claim 2, wherein:

said drive member comprises an intake door that opens/closes an internal air induction port and an external air induction port in an air conditioning system for vehicles, a mix door provided at a downstream side of a heat exchanger for cooling provided in said air conditioning system for vehicles which adjusts a quantity of air that passes through a heat exchanger for heating provided at a downstream side of said heat exchanger for cooling and mode doors that open/close outlet ports in said air conditioning system for vehicles.

19. An actuator control apparatus according to claim 3, wherein:

said drive member comprises an intake door that opens/closes an internal air induction port and an external air induction port in an air conditioning system for vehicles, a mix door provided at a downstream side of a heat exchanger for cooling provided in said air conditioning system for vehicles which adjusts a quantity of air that passes through a heat exchanger for heating provided at a downstream side of said heat exchanger for cooling and mode doors that open/close outlet ports in said air conditioning system for vehicles.

20. An actuator control apparatus according to claim 4, wherein:

said drive member comprises an intake door that opens/closes an internal air induction port and an external air induction port in an air conditioning system for vehicles, a mix door provided at a downstream side of a heat exchanger for cooling provided in said air conditioning system for vehicles which adjusts a quantity of air that passes through a heat exchanger for heating provided at a downstream side of said heat exchanger for cooling and mode doors that open/close outlet ports in said air conditioning system for vehicles.

* * * * *